May 9, 1967     I. M. PLASTOCK     3,317,968
CLAMPING MEANS FOR ORNAMENTAL TRIM
Filed Oct. 28, 1964     3 Sheets-Sheet 3
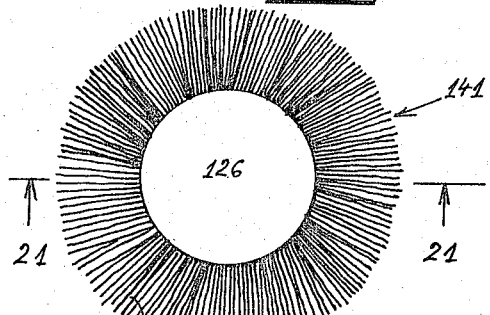
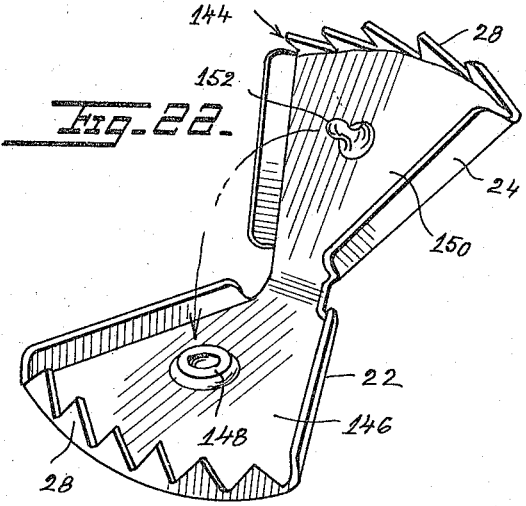
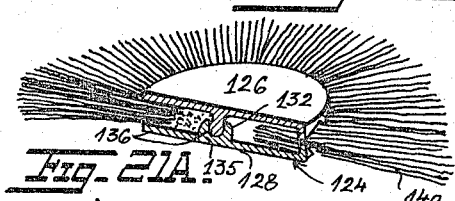
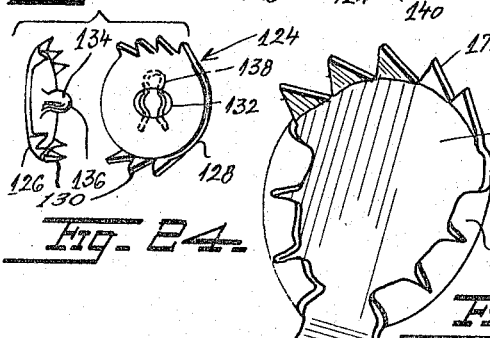
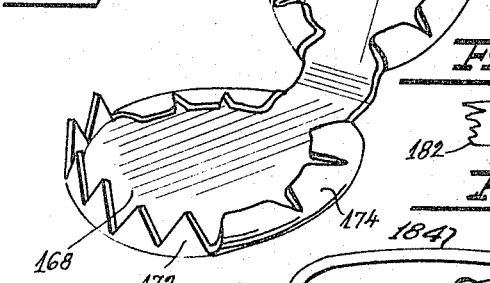
INVENTOR.
Irving M. Plastock
BY
Polachek & Saulsbury
ATTORNEYS.

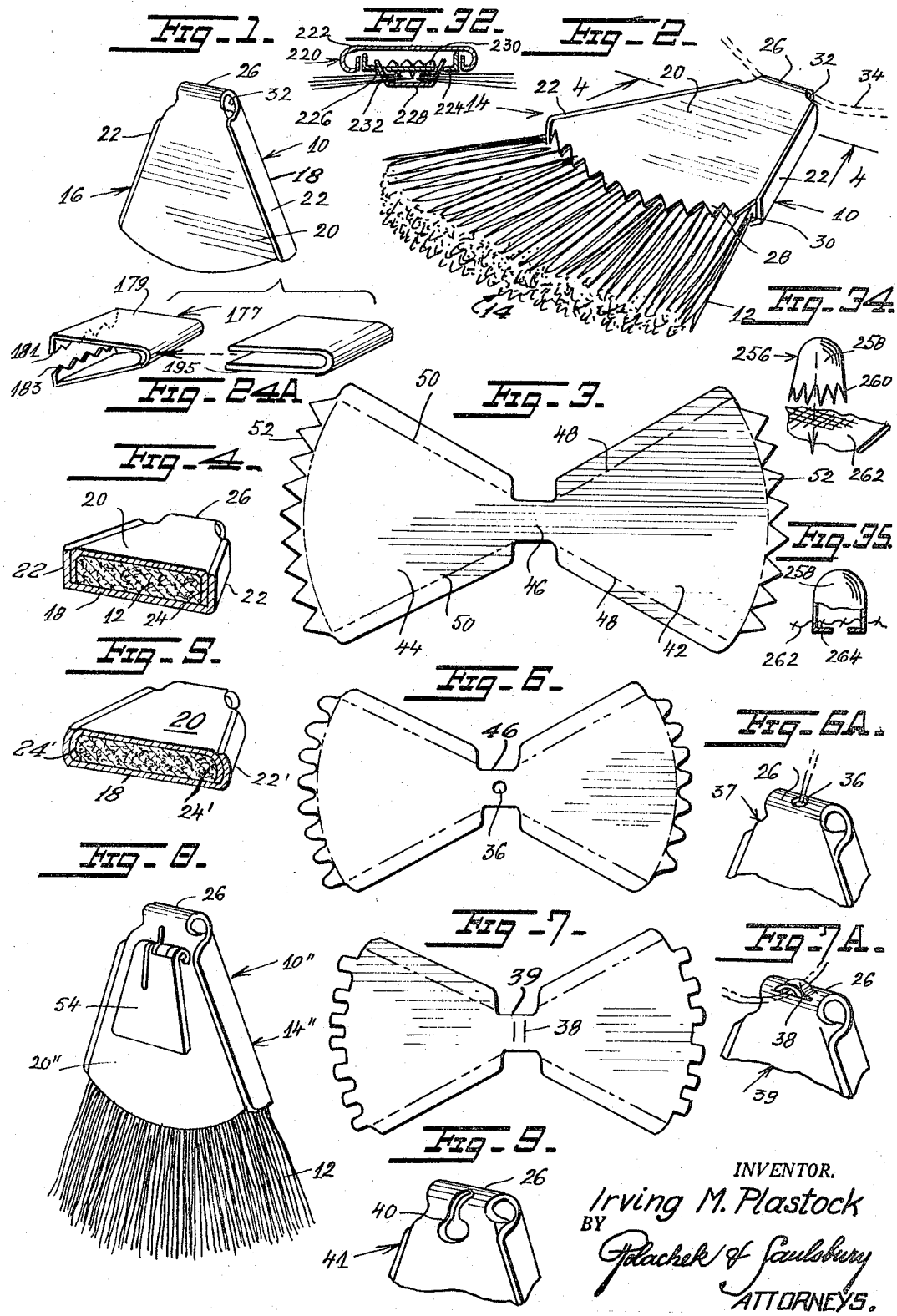

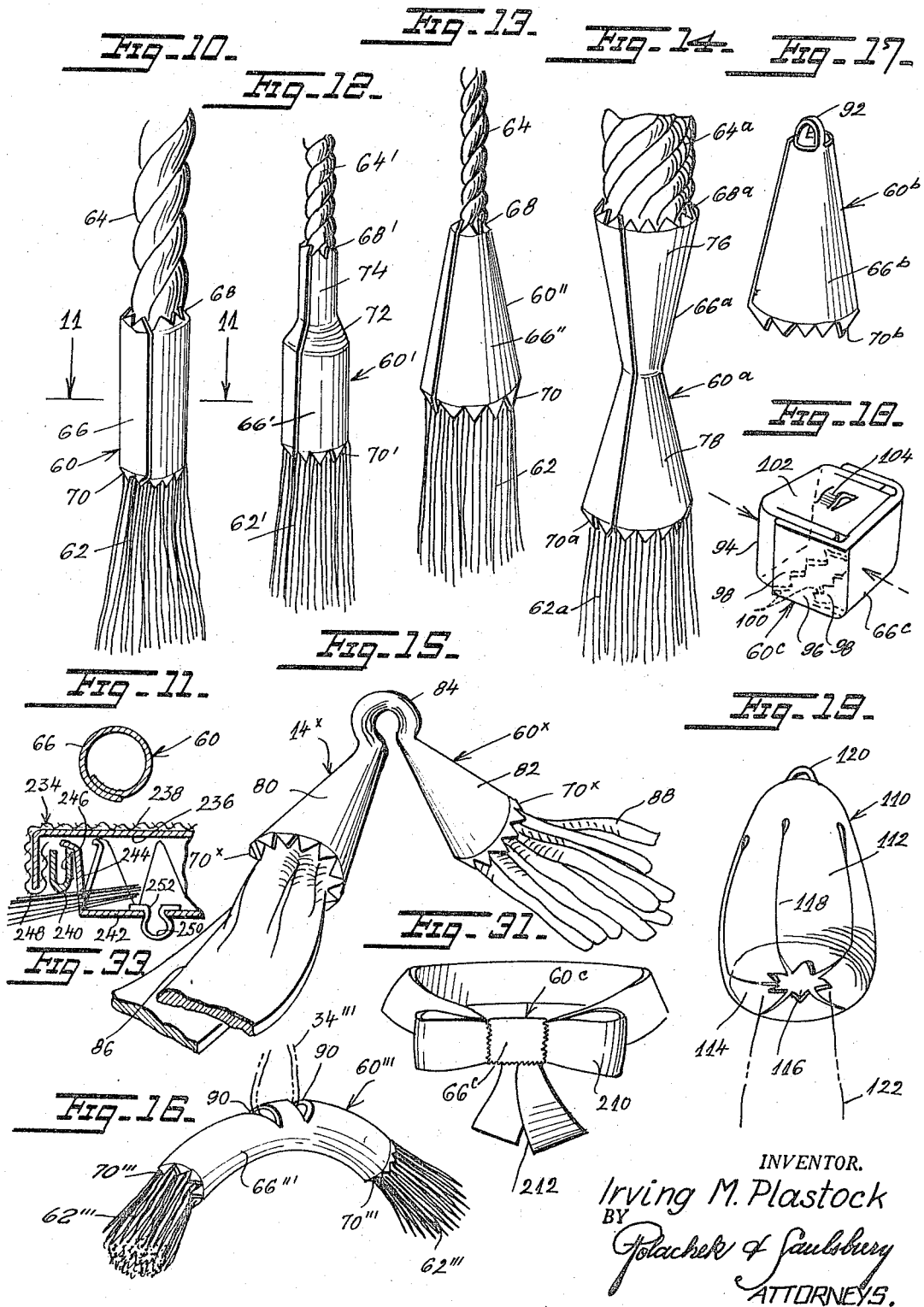

United States Patent Office 3,317,968
Patented May 9, 1967

3,317,968
CLAMPING MEANS FOR ORNAMENTAL TRIM
Irving M. Plastock, 2470 64th St.,
Brooklyn, N.Y. 11204
Filed Oct. 28, 1964, Ser. No. 407,064
3 Claims. (Cl. 24—73)

This invention relates generally to fasteners and more particularly to clamps.

An important object of the present invention is to provide unique clamps adapted to be used in connection with a number of different articles and materials.

Another object of the invention according to certain modifications of the invention is to provide a clamp device that is adapted to maintain a plurality of elongated articles in spread-out, fan-like formation.

A further object of the invention according to other modifications of the invention is to provide a clamp device that is adapted to maintain a plurality of elongated articles in a bundle or to maintain bulky or fluffy material.

Still another important feature of the invention is found in the method of assembly, that is, the structural parts of the clamp which makes assembly a very simple matter.

It is a further object to provide an inexpensive clamp having a minimum number of parts which can be readily manufactured and assembled.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a perspective view of a clamp device embodying one form of the invention.

FIG. 2 is a top perspective view of the clamp of FIG. 1 shown in engagement with a plurality of strands of hair, constituting a broom.

FIG. 3 is a top plan view of the clamp blank.

FIG. 4 is a cross sectional view taken on the plane of the line 4—4 of FIG. 2.

FIG. 5 is a view similar to FIG. 4 showing a modified form of clamp.

FIG. 6 is a top plan view of the blank of still another modified form of clamp.

FIG. 6A is a fragmentary perspective view of the top of the clamp of FIG. 6, assembled.

FIG. 7 is a top plan view of the blank of yet another modified form of clamp.

FIG. 7A is a fragmentary perspective view of the top of the clamp of FIG. 7, assembled.

FIG. 8 is a view similar to FIG. 1 of a clamp embodying yet another modified form of the invention applied to a plurality of strands of hair.

FIG. 9 is a fragmentary perspective view of the top of a clamp embodying yet another modified form of the invention.

FIG. 10 is a front elevational view of a clamp embodying a still further modified form of the invention applied to the strands of a rope and a bundle of tassel strands.

FIG. 11 is a cross sectional view taken on the line 11—11 of FIG. 10, parts being omitted.

FIG. 12 is a view similar to FIG. 10 of a clamp embodying another modified form of the invention.

FIG. 13 is a view similar to FIG. 10 of a clamp embodying a still further modified form of the invention.

FIG. 14 is a view similar to FIG. 10 of a clamp embodying yet another modified form of the invention.

FIG. 15 is a perspective view of a clamp embodying yet another modified form of the invention shown in engagement with several thicknesses of material and a bundle of tassel strands.

FIG. 16 is a perspective view of a clamp embodying still another modified form of the invention shown in engagement with a bundle of strands of hair.

FIG. 17 is a side elevational view of a clamp embodying still another modified form of the invention.

FIG. 18 is a perspective view of a clamp device embodying yet another modified form of the invention.

FIG. 19 is a perspective view of a clamp embodying yet another modified form of the invention, a bundle of strands being shown in dash lines.

FIG. 20 is a top plan view of a clamp embodying another modified form of the invention shown in engagement with a plurality of strands of hair in annular formation.

FIG. 21 is a cross-sectional view taken on the plane of the line 21—21 of FIG. 20.

FIG. 21A is a disassembled perspective view of the parts of the clamp of FIG. 20.

FIG. 22 is a view in perspective of the blank of a clamp embodying yet another modified form of the invention.

FIG. 23 is a view similar to FIG. 22 of the blank of a clamp embodying a further modified form of the invention.

FIG. 24 is a view similar to FIG. 22 of the blank of a clamp embodying yet another modified form of the invention partly bent.

FIG. 24A is a disassembled perspective view of still another modified form of sectional clamp.

FIG. 25 is a side elevational view of the clamp of FIG. 22 in engagement with strands of hair and applied to the buckle of a belt.

FIG. 26 is a side elevational view of the clamp of FIG. 15 in engagement with bundles of strands of hair and applied to a necklace.

FIG. 27 is a side elevational view of the clamp of FIG. 22 in engagement with strands of hair and applied to a necktie.

FIG. 27A is a cross-sectional view taken on the line 27A—27A of FIG. 27.

FIG. 28 is a side elevational view of the clamp of FIG. 7A in engagement with strands of hair and applied to a hook.

FIG. 29 is a front elevational view of the clamp of FIG. 20 in engagement with strands of hair in annular formation applied to a vest garment.

FIG. 30 is a perspective view of the clamp of FIG. 24 in engagement with a plurality of strands of hair applied to a shoe.

FIG. 31 is a perspective view of the clamp engaged with several thicknesses of material and applied to a collar and necktie assembly.

FIG. 32 is a view similar to FIG. 21 of still another modified form of the invention.

FIG. 33 is a similar view showing a fragment of yet another modified form of the invention.

FIG. 34 is a disassembled top perspective view of a clamp embodying a still further modified form of the invention, and FIG. 35 is a part sectional and part elevational of the clamp of FIG. 34 in assembled relation.

Referring now in detail to the various views of the drawings, in FIG. 1 a clamp embodying one form of the invention is shown and designated generally at 10. In FIG. 2, the clamp 10 is shown clamping a plurality of strands of hair 12 in spread-out fan formation constituting a tassel structure 14.

The clamp 10 comprises a substantially triangular shaped body 16 with closely spaced wide front and rear walls 18 and 20, respectively, and overlapping narrow flat side walls 22 and 24, but the side walls may be slightly curved instead, as shown at 22' and 24' in the modified form of clamp of FIG. 5. The front and rear walls are joined at the narrow ends by a neck portion 26 and are formed with teeth 28 bent inwardly toward each other along the wide end of the body. The teeth are spaced from each other, providing an entrance opening 30 for the strands of hair 12. The neck portion defines a passage 32 to receive a supporting string 34 or the like, but the neck may be provided with a hole 36 instead of the passage as shown in the modified form of clamp 37 shown in FIGS. 6 and 6A, or with a loop 38 as shown in the modified form of clamp 39 shown in FIGS. 7 and 7A, or with a keyhole slot 40 as shown in the modified form of clamp 41 shown in FIG. 9.

The body is assembled from the blank shown in FIG. 3 stamped from sheet metal, but the blank may be injection molded from plastic materials such as the acrylic polymers or metal castings. The blank is shaped to provide a pair of spaced substantially triangular shaped wing portions 42 and 44 constituting the front and rear walls 18 and 20, respectively, and has a narrow flat portion 46 constituting the neck portion 26. The blank is formed with crease lines 48 and 50 along the line closely spaced from the long edges of the wing portions 42 and 44, respectively, said crease lines facilitating formation of the narrow side walls 22 and 24, respectively. Along the peripheries of the wide ends of the wing portions 42 and 44, there are teeth 52 forming extensions of the wing portions, which form the teeth 28 of the assembled clamp.

In assembling the clamp 10, the body of the blank is bent along the crease lines 48 and 50, forming the side walls 22 and 24 on the front and rear walls 18 and 20, respectively. The teeth 52 are then bent laterally, forming the teeth 28 of the assembled clamp. The body is next bent midway the ends of the neck portion 46 bringing the wing portions toward each other, forming the front and rear walls and whereby the walls 22 on the front wall overlap the walls 24 on the rear wall, leaving the opening 30 between the teeth 28 of the assembled clamp. The hair strands 12 are inserted through the opening 30 in spread out formation, and the front and rear walls are squeezed into intimate contact with the strands of hair 12, the teeth 28 biting into strands as shown in FIG. 2. The neck portion 46 of the blank extends the wing portions, forming the neck portion 26 of the assembled clamp, thereby providing the passage 32 to receive a string 34 or the like for supporting the tassel structure 14.

The modified form of clamp 10″ shown in FIG. 8, differs from the clamp 10 of FIG. 1 merely in that a spring pressed plate 54 has been pivotally mounted on the rear wall 20″ of the clamp so that the brush 14″ may be clamped to a thin flat supporting surface by lifting the plate, inserting the supporting surface thereunder and then releasing the plate.

In FIGS. 10 and 11, a modified clamp 60 is shown serving to clamp a bundle of tassel strands 62 to the adjacent end of a cord 64 of twisted strands. The clamp 60 comprises a split sleeve body 66 of sheet metal with the split edges in overlapping relation. The top and bottom end edges of the sleeves as viewed in FIG. 10 are formed with teeth 68 and 70 embedded in the cord strands and tassel strands, respectively.

Another modified form of split sleeve type clamp 60′ is shown in FIG. 12. The clamp 60′ has a split sleeve body 66′ of sheet metal with the split edges in overlapping relation. The bottom end edge is formed with teeth 70′ and the top end of the body terminates in an inwardly slanting shoulder 72 continuing into a split tubular extension 74 which terminates in teeth 68′ on the end edge thereof. The bottom teeth 70′ are embedded in the strands 62′ and the top teeth 68′ in the strands of the cord 64′.

The modified clamp 60″ shown in FIG. 13 comprises a tapered split sleeve body 66″ in place of the sleeve body of uniform width of clamp 60 of FIGS. 10 and 11.

Referring now to the modified form of clamp 60a shown in FIG. 14, herein the clamp has a split body 66a of hyperbolical shape including a conical upper section 76 and an inverted conical lower section 78. Teeth 70a are formed on the lower end edge of the lower section 78 and teeth 68a on the top end edge of the top section 76. The teeth 70a are embedded in the tassel strands 62a and the teeth 68a are embedded in the strands of the rope 64a.

In FIG. 15 still another modified form of clamp 60x is illustrated comprising an inverted V-shaped body composed of a pair of slanting tapered split body sections 80 and 82 joined at their narrow ends by a hemispherical loop portion 84. Teeth 70x are formed on the wide ends of the body sections. The teeth 70x on the body section 80 are engaged in several thicknesses of cloth material 86, and the teeth 70x on the body section 82 are embedded in strands of material 88, thereby forming a tassel structure 14x.

FIG. 16 illustrates a modified form of clamp 60‴ constituted by a slightly curved split tubular body 66‴, with teeth 70‴ formed at both ends thereof for engagement with strands 62‴ of hair. The both ends are formed with closely spaced transverse slots 90 to receive a supporting string 34‴ or the like.

In FIG. 17, yet another modified form of clamp 60b is illustrated having a tapered split tapered body 66b, formed with teeth 70b on the bottom end thereof and formed with an integral loop 92 at the top narrow end thereof for receiving a supporting string (not shown).

Still another modified form of clamp 60c is shown in FIGS. 18 and 31, wherein the clamp consists of a sectioned body 66c composed of two complementary U-shaped movable sections 94 and 96, each section having a bottom flange portion 98 formed with teeth 100, the flanges and teeth being in opposed spaced relation. The section 94 is of smaller dimensions than the section 96 and carries a top closure plate 102 closing the top of the body. An outstruck loop 104 is formed on the plate 102 for receiving a supporting string. Thicknesses of cloth material may be clamped between the teeth 100 by movement of the teeth thereagainst, as shown in FIG. 31.

In FIG. 19, yet another modified form of clamp 110 is illustrated wherein the clamp has a pear-shaped slitted hollow body 112. The body has a circular flat bottom 114 formed with a central toothed hole 116 intersected by the bottom ends of the slits 118 in the body. An integral loop 120 is formed on the top narrow end of the body for receiving a supporting string. A bundle of strands indicated at 122 is adapted to be inserted through the hole 116 and clamped therein by the teeth of the hole 116.

A sectional disc type of modified clamp 124 is shown in FIGS. 20, 21 and 21a. The clamp 124 includes a pair of complemental disc members 126 and 128. The disc members are each formed with teeth 130 on opposed portions of the peripheries thereof, the teeth extending at right angles to the plane of the bodies of the disc members. Disc 128 is formed with a cup-shaped socket 132 at its center and disc 126 is formed with a lug 134 formed with a spherical head 136 adapted to be plugged into the socket 132. A cotter pin 138 engages the socket and plug to hold the sections together. Radially disposed strands of hair 140 are clamped between the teeth and peripheral edges of the members 126 and 128, forming a button ornament 141.

The modified form of clamp 144 shown in FIG. 22 differs from the clamp 10 of FIG. 1 in that the rear wall 146 is formed with an annular socket member 148 on its inner surface and the front wall 150 is formed with a ball shaped plug 152 adapted to be pressed into the socket member 148 for holding the walls in clamping position. In all other respects the clamps 10 and 144 are similar and similar reference numerals are used.

In FIG. 23, the modified form of clamp 154 is somewhat similar to the clamp 10 of FIG. 1 differing only in that the front wall 156 of clamp 154 has an elongated keeper member 158 channel-shaped in cross-section and the rear wall 160 has an elongated key member 162 shaped to frictionally fit into the keeper member for holding the walls together in clamping position.

In FIG. 24, another modified form of clamp 166 is shown which differs from clamp 10 of FIG. 1 in that the front and rear walls 168 and 170 are circular in shape with teeth around the peripheral edges thereof. Some of the teeth, for example, teeth 172, are pointed while the remainder of the teeth, for example, teeth 174, are blunt and square cornered.

FIG. 24a shows yet another modified form of sectional type of clamp 177 consisting of a substantially V-shaped body 179 of spring metal having opposed teeth 181, 183 on the wide end thereof. A U-shaped sheet metal member 195 is slidable over the body 179 in order to close the teeth on strands of hair or strips of cloth in order to form a tassel or the like.

The clamps and articles thus far described have various uses; for instance, in FIG. 25, the tassel structure 14 of FIG. 1 is shown as an ornament on the buckle 180 of a belt 182.

In FIG. 26, the tassel structure 14x of FIG. 15 is shown as a pendant on a necklace 184.

The clamp 144 of FIG. 22 is shown clamping hair strands 185 forming a tassel structure 186 shown applied as an ornament on a necktie 188 in FIG. 27.

In FIG. 28, the clamp 39 of FIG. 7a is shown clamping hair strands 190 forming a tassel structure 192 fastened to a string 194 suspended from a hook device 196.

FIG. 29 illustrates the bottom ornament 141 of FIG. 20 covering the outer surfaces of conventional buttons 198 on a vest garment 200 for ornamenting the vest garment.

FIG. 30 shows the clamp 166 of FIG. 24 clamping a cluster of hair ornaments 202 forming a tassel structure 204 ornamenting the flap 206 of a shoe 208.

In FIG. 31, the clamp device 60c of FIG. 18 is shown clamping the folds 210 of a bow necktie 212.

The modification of the invention shown in FIG. 32 constitutes a sectional clamp 220 including a pair of complemental flanged disc members 222 and 224 in nested relationship. The disc member 224 is formed with a series of holes 226 in annular formation. Underneath disc member 224 there is a circular plate 228 having teeth 230 projecting upwardly from the periphery thereof and extending through the holes 226 in disc member 224. The teeth 230 are sufficiently long to space the plate 228 away from the body of disc member 224 thereby leaving a space therebetween to receive the inner ends of radially disposed strands of hair 232 in clamping relationship, the hair projecting outwardly between the teeth 230.

The modified form of clamp 234 shown in FIG. 33 is somewhat similar to the clamp 220 of FIG. 32 except that the upper circular flanged disc 236 is provided with a felt cover 238 clamped in position by an annular clamp 240 U-shaped in cross-section. A circular plate 242 is provided with upstanding peripheral teeth 244 that are bent over the inner leg 246 of the clamp 240 thereby clamping the inner ends of radial strands of hair 248 between the bottom of the clamp 240 and the plate 242, the hair extending through the spaces between the teeth. A loop 250 is inserted through a hole 252 in the center of the plate 242 and serves as a handle.

In FIGS. 34 and 35, yet another modified form of clamp 256 is shown consisting of a dome shaped body 258 formed with teeth 260 on the bottom peripheral edge thereof. The teeth are adapted to bite through a fabric strip 262 and be bent over as indicated at 264 to clamp the body in position on the fabric strip.

While I have illustrated and described the preferred embodiments of my invention, it is to be understood that I do not limit myself to the precise constructions herein disclosed and that various changes and modifications may be made within the scope of the invention as defined in the claims.

What is claimed is:

1. A clamp comprising a substantially triangular shaped body with closely spaced front and rear walls, narrow overlapping side walls, said body being open at the wide end, opposed teeth on the wide end for engaging and clamping an article therebetween, and a neck portion at the narrow end of the body, said neck portion being tubular to receive a flexible supporting member and constituting a closure member for said narrow end, said neck portion being formed with an outstruck loop for receiving a flexible member.

2. A clamp comprising a substantially triangular shaped body with closely spaced front and rear walls, narrow overlapping side walls, said body being open at the wide end, opposed teeth on the wide end for engaging and clamping an article therebetween, and a neck portion at the narrow end of the body, said neck portion being tubular to a flexible supporting member and constituting a closure member for said narrow end, said neck portion being formed with a keyhole slot for receiving a flexible member.

3. A clamp comprising a substantially triangular shaped body with closely spaced front and rear walls, narrow overlapping side walls, said body being open at the wide end, opposed teeth on the wide end for engaging and clamping an article therebetween, a neck portion at the narrow end of the body, said neck portion being tubular to receive a flexible supporting member and constituting a closure member for said narrow end, and a spring-pressed movable plate on the rear wall adjacent the neck portion for clamping the body to a support.

References Cited by the Examiner

UNITED STATES PATENTS

| | | | |
|---|---|---|---|
| 221,353 | 11/1879 | Potter | 24—123 |
| 389,072 | 9/1888 | Gordon | 24—81 |
| 646,091 | 3/1900 | Hammond. | |
| 754,517 | 3/1904 | Thomson | 24—120 |
| 843,596 | 2/1907 | Fogarty | 15—205 |
| 847,114 | 3/1907 | Roewe et al. | 24—123 |
| 867,814 | 10/1907 | Fornander. | |
| 1,031,306 | 7/1912 | Williams | 24—255 |
| 1,274,220 | 7/1918 | Ulrey | 24—120 |
| 1,412,505 | 4/1922 | Carlson | 24—11 |
| 2,044,679 | 6/1936 | Frese | 24—135 X |
| 2,108,255 | 2/1938 | Devendor et al. | 24—95 |
| 2,130,585 | 9/1938 | Howell | 24—123 |
| 2,172,989 | 9/1939 | Ronci | 24—143 |
| 2,563,533 | 8/1951 | Knox. | |
| 2,607,094 | 8/1952 | Nicosia | 24—123 |
| 2,640,238 | 6/1953 | Schuhr | 24—113 |
| 2,649,634 | 8/1953 | Zelenay | 24—113 |
| 3,137,880 | 6/1964 | Kubit et al. | 24—259 X |

FOREIGN PATENTS

| | | |
|---|---|---|
| 1,307,456 | 9/1962 | France. |
| 6,555 | 1908 | Great Britain. |
| 186,530 | 12/1936 | Switzerland. |

WILLIAM FELDMAN, *Primary Examiner.*

E. SIMONSEN, *Assistant Examiner.*